US006888354B1

(12) United States Patent
Gofman

(10) Patent No.: US 6,888,354 B1
(45) Date of Patent: May 3, 2005

(54) APPARATUS AND METHOD FOR DETECTING MISSING OR DEFECTIVE BATTERY CONDITIONS

(75) Inventor: Igor Y. Gofman, Croton-on-Hudson, NY (US)

(73) Assignee: ASCO Power Technologies. L.P., Florham Park, NJ (US)

(*) Notice: Subject to any disclaimer, the term of this patent is extended or adjusted under 35 U.S.C. 154(b) by 0 days.

(21) Appl. No.: 10/679,679

(22) Filed: Oct. 3, 2003

(51) Int. Cl.$^7$ .......................... G01N 27/416; H02J 7/00
(52) U.S. Cl. ...................... 324/427; 324/432; 324/434; 320/137; 320/138
(58) Field of Search ............................. 324/427–435; 320/137–145

(56) References Cited

U.S. PATENT DOCUMENTS 6,160,381 A * 12/2000 Peterzell ..................... 320/134
6,194,869 B1 * 2/2001 Peterzell ..................... 320/134
6,215,198 B1 * 4/2001 Inada et al. ............... 290/40 C
6,452,364 B1 * 9/2002 Saeki et al. ................. 320/137

OTHER PUBLICATIONS

*NFPA 20 Standard for the Installation of Stationary Pumps for Fire Protection*, NFPA 1999 Edition. No month available.

Lead–Acid Fast–Charge IC, Texas Instruments Incorporated, Jun. 1999, pp. 1–16.

* cited by examiner

*Primary Examiner*—Vincent Q. Nguyen
(74) *Attorney, Agent, or Firm*—McDonnell Boehnen Hulbert & Berghoff LLP

(57) ABSTRACT

An apparatus and method for detecting battery removal, battery absence, and/or defective battery condition for use with battery charging and testing systems is provided. The apparatus includes a regulator, feedback module, controller, and detector module. The regulator and feedback module supply a regulated charging signal to a battery. The controller interrupts the feedback module so as to cause the regulator to suspend supplying the charging signal to the battery, which in turn, allows the charging signal to discharge for a predetermined period of time. During the predetermined period, the detector module detects whether the charging signal discharges below a predetermined threshold. When the charging signal discharges below the predetermined threshold, the detector module detects one or more conditions that indicate that the battery cannot be charged. These conditions include conditions that indicate that the battery is absent, missing, and/or defective.

27 Claims, 5 Drawing Sheets

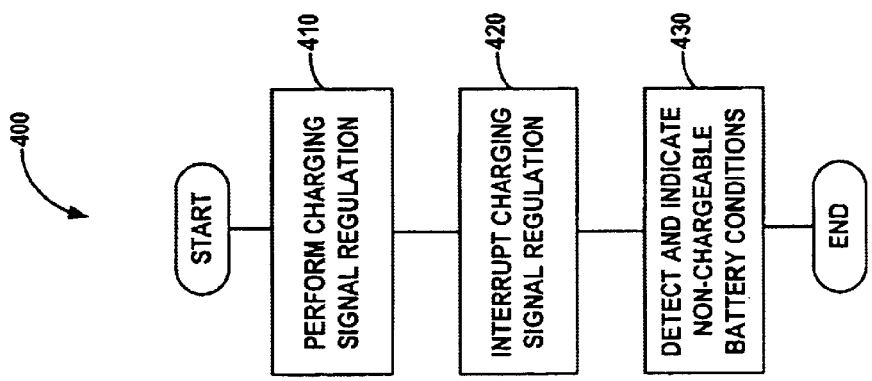

APPARATUS AND METHOD FOR DETECTING MISSING OR DEFECTIVE BATTERY CONDITIONS

FIELD

The following relates generally to charging and testing of battery systems and methods, and more particularly, to an apparatus and method for detecting a condition that indicates a battery cannot be charged. The apparatus and method is particularly useful for detecting battery removal, battery absence and/or defective battery conditions.

BACKGROUND

Batteries provide an excellent source of power wherever there is a need for portable power and/or whenever the use of wireline power is not desirable or available. Devices powered by rechargeable batteries have become so pervasively integrated into people lives that it becomes a major inconvenience when the devices no longer work because the batteries have been removed or can no longer hold a charge.

For instance, most, if not all, of today's automobiles, back-up power generators, and other devices that employ large engines require batteries to power the devices' electric starters. Moreover, many of these devices use "high-energy" ignition systems to operate the engines after being started. These starting and ignition systems cannot function without being driven from the battery. In addition, many portable computing and telecommunication products use rechargeable batteries as a source of power. When unconnected from a wireline power source, these devices can also fail if the rechargeable battery has been removed or cannot hold a charge.

As is evident from its name, a "rechargeable" battery is a battery that has been designed to be recharged after some or all of the previous charge has been expended.

Most rechargeable batteries can be recharged many times. However, due to the materials, construction, and other battery-technology restrictions, rechargeable batteries eventually fail and can no longer hold a charge.

Further, in the wake of many recent events, such as the destruction of the World Trade Center, the North America Northeast Power-Grid failure, and the on-going worldwide effort to rid the world of terrorism, many have taken an introspective look at back-up power systems, safety-alerting systems and other systems, which use rechargeable battery subsystems in the case of power failure. Upon reflection, a need for detecting when the battery has failed or been removed has been noted.

Besides the inconvenience and annoyance of a missing and/or failed battery, serious conditions can arise when an unsuspecting user goes to use a particular piece of equipment that uses a rechargeable battery for starting and/or operation (e.g., a back-up power system) and is unwittingly surprised that they cannot use the device because the rechargeable battery has been removed (maliciously or not) and/or failed. No matter how much was spent to buy and install the back-up power system, without a functioning rechargeable battery the entire system becomes useless.

Other equally serious conditions can arise with other systems when the battery is absent or cannot hold a charge. While usually only an inconvenience and not seemingly serious initially, portable electronics that use rechargeable batteries, such as cell phones or construction-site walkie-talkies, can place their users in some distressful situations. For instance, when a user relies on one of these devices for emergency purposes, but is unaware that the device's battery has failed or been removed (thereby making the device unusable), he or she may be unsuspectingly surprised when attempting to use the device after an emergency arises.

Given the pervasive use of rechargeable batteries and opportunity for deployment in most any battery charging and testing apparatus or method, it would be desirable to provide an apparatus and method that is capable of detecting battery removal, battery absence and/or defective battery conditions.

SUMMARY OF THE INVENTION

An apparatus and method for detecting battery removal, battery absence and/or defective battery conditions that can occur in battery charging and/or testing systems and methods is provided. The apparatus may include a regulator, a feedback module, a controller, and a detector module. The regulator may include a charge-transfer part that is operable to supply a charging signal to a battery. Responsive to a charged stored in the battery, the feedback module is operable to provide feedback to the regulator for controlling the charging signal.

The controller is operable to interrupt the feedback module so as to cause the regulator to suspend supplying the charging signal to the battery. This, in turn, allows the charge-transfer part to discharge for a predetermined period of time. During the predetermined period, the detector module is operable to detect whether a charge stored on the charge-transfer part satisfies a predetermined threshold.

When the charge stored on the charge transfer part satisfies the predetermined threshold, the detector module may detect one or more conditions that indicate that the battery cannot be charged. These conditions may include a condition that indicates that the battery is absent, missing, and/or defective. The detector module may detect such a condition whether or not a load is coupled to charging signal.

In an exemplary embodiment, the charge-transfer part is operable to supply the charging signal in excess of a charge stored in the battery. The predetermined threshold may be set at a value below a pre-selected minimum charging level of the battery, so that when the charge stored on the charge transfer part falls below the predetermined threshold, the detector module detects one of the conditions that indicate that the battery cannot be charged.

In another exemplary embodiment, the predetermined threshold may be set at a value equal to or approximately equal to a minimum charging level of a reference and/or gage battery. Accordingly, when the charge stored on the charge transfer part falls below the predetermined threshold, the detector module detects one of the conditions that indicate that the battery cannot be charged.

In yet another embodiment, the apparatus may include an indicator (e.g., an illuminating indicator) for indicating when the charge stored on the charge-transfer part satisfies the predetermined threshold. Thus, when the charge stored on the charge-transfer part satisfies the predetermined threshold, the indicator provides an alert. The indicator can switch from on-to-off or off-to-on when the charge stored on the charge-transfer part satisfies the predetermined threshold.

BRIEF DESCRIPTION OF THE DRAWINGS

Exemplary embodiments are described below in conjunction with the appended drawing figures, wherein like reference numerals refer to like elements in the various figures, and wherein:

FIG. 3b is a timing diagram illustrating a threshold-detection signal and a detection-driver signal for use with the exemplary controller shown in FIG. 3a;

FIG. 4 is a flow chart illustrating an exemplary flow for carrying out an operation of one or more charging-and-detection architectures.

DESCRIPTION OF EXEMPLARY EMBODIMENTS

The following describes exemplary embodiments directed to an apparatus and method that provide an efficient approach to detecting battery removal, battery absence and defective battery conditions in a battery charger and/or tester. This efficient approach applies whether or not a load is coupled to an output of the charger and/or tester.

As noted above, rechargeable batteries may be re-charged when some or all of the charge of the battery has been depleted. To take advantage of rechargeable battery technology, a battery charger is needed to re-charge and/or maintain the battery's charge. Battery chargers can be employed in various formats. For instance, the battery charger can be (i) deployed as a standalone device, (ii) integrated into another device or (iii) integral to another device.

As a standalone device, the battery charger can charge a battery separate from the device in which the battery is used. Alternatively, the standalone battery charger can charge the battery while it is coupled to the other device. Standalone battery chargers may include charging-and-detection architecture for detecting battery removal, battery absence and/or defective battery conditions. This architecture may have one or more subsystems and/or a plurality of circuitry for carrying out the detection of these conditions.

In addition to the standalone devices, many of the systems and devices that employ rechargeable-battery technology use integrated or integral architecture for recharging the battery and for detecting battery removal, absence and/or defective battery conditions. Like the standalone devices, this architecture may include one or more subsystems and/or include a plurality of circuitry.

In the present context, integrated architecture merely means that the subsystems and/or circuitry are included into a larger system. Integral architecture, on the other hand, merely means that the subsystems, architecture and functions thereof are commingled with other parts of a larger system.

Battery testers, like battery chargers, can be (i) deployed as a standalone device, (ii) integrated into another device or (iii) integral to another device. Battery testers may employ architecture for carrying out battery charging and testing so as to determine whether a battery is properly functioning. These battery testers may also employ architecture for detecting battery removal, battery absence and/or defective battery conditions. This architecture may deploy one or more subsystems and/or include a plurality of circuitry to carry out these tasks.

1. Exemplary Charging-and-Detection Architectures

Figure 1:
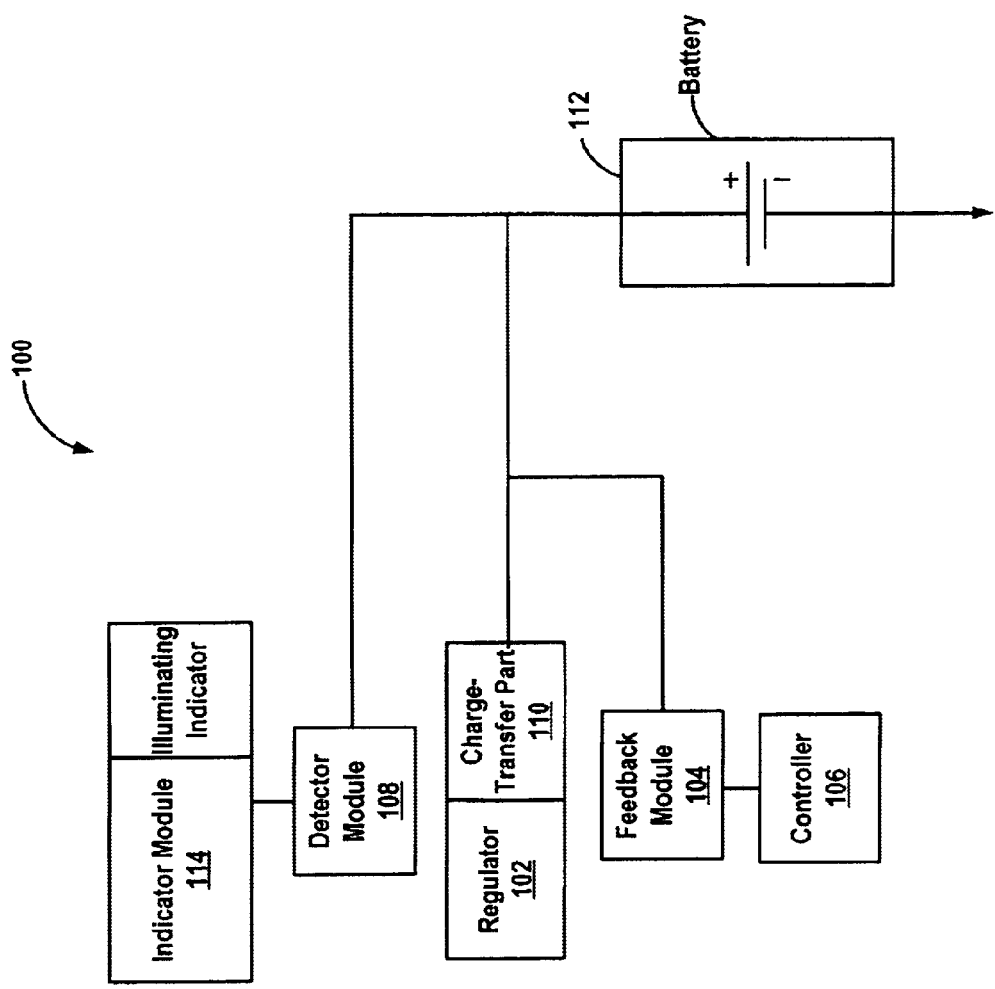
FIG. 1 is a block diagram illustrating exemplary charging-and-detection architecture that may be used for detecting battery removal, battery absence and/or defective battery conditions in various battery charging and testing systems and methods.

FIG. 1 illustrates exemplary charging-and-detection architecture 100 that may be used in a battery charging and/or testing system. This charging-and-detection architecture 100 may include a regulator 102, a feedback module 104, a controller 106, and a detector module 108.

The regulator 102 may have a charge-transfer part 110 that is operable to transfer a stored charging signal to a battery 112. The charging signal may be used to charge the battery 112 to and/or maintain the battery 112 at a pre-selected charge. To facilitate this, the charging signal may be supplied in excess of this pre-selected charge and/or any charge stored in the battery.

Some or all of the regulation provided by the regulator 102, and in turn, the charge-transfer part 110, may be controlled using feedback supplied from the feedback module 104. The feedback module 104 may, for example, control the amount or rate of regulation provided by the regulator 102 so as to cause the regulator 102 to vary the amount of charging signal supplied. This amount and/or rate of regulation may be varied in response to an amount of charged stored in the battery 112. For instance, when the amount of charged stored in the battery 112 is close to the pre-selected charge, the feedback module 104 may cause the regulator 104 to supply to the battery 112 a decreasingly small amount of charging signal. After the battery reaches the pre-selected charge, the regulator can continue to supply a small charging signal to maintain the battery 112 at the pre-selected charge.

On the other hand, when the amount of charged stored in the battery 112 is not close to the pre-selected charge, the feedback module 104 may cause the regulator 102 to supply a larger amount of charging signal. Like above, the amount of charging signal may be decreased as charge of the battery 112 approaches the pre-selected charge. While the amount of charging signal may be, for example, proportional to a function of the charge stored in the battery 112, the feedback module 104 may employ other (e.g., time-based) approaches for controlling the regulator 102.

The controller 106, which may have an output coupled to an input of the feedback module 104, is provided to interrupt or temporarily suspend the feedback regulation provided by the feedback module 104. By interrupting or temporarily suspending the feedback regulation, the controller 106 may cause feedback module 104, and in turn, the regulator 102 to suspend supplying the charging signal to the battery 112 for a predetermined period of time ("suspension period"). This, in turn, may allow a discharge of some or all of any charging signal stored in the charge-transfer part 110.

If, for example, the charging signal supplied from the charge-transfer part 110 is in excess of the charge stored in the battery 112, then any stored charge in the charge-transfer part 110 can discharge towards the charged stored in the battery 112. The charging signal, however, need not be greater than the charge stored in the battery 112. All that is needed is that some or the entire charging signal stored in the charge-transfer part 110 be able to discharge or otherwise change.

When the battery 112 is coupled to the charging signal, the rate and amount of the discharge may differ from when no battery or a defective battery is coupled to the charging signal. This may occur because the load coupled to the charging signal differs from when the battery 112 is connected and from when it is not.

To detect whether battery 112 is coupled to the charging signal, the charging-and-detection architecture 100 may employ the detector module 108 for detecting one or more conditions that indicate that the battery 112 cannot be charged. The detector module 108 may, for example, detect if the charge stored on the charge-transfer part 110 satisfies, e.g., falls below, a predetermined threshold during the suspension period. As described in more detail below, the predetermined threshold may be any threshold that signifies when the battery 112 is not coupled to the charging signal or the battery 112 is defective.

The predetermined threshold may be set at a value at or below a pre-selected minimum charging level of the battery 112, which for example may be about 8 volts for a lead-acid-type battery. Thus, when the charge stored in the charge-transfer part 110 equals or falls below the pre-selected minimum charging level of the battery 112, the detector module 108 detects a condition that indicates that the battery 112 cannot be charged.

Alternatively, the predetermined threshold may be set at a value approximately equal to or equal to a minimum charging level of a reference or gage battery, which can vary depending on the reference or gage battery used. This reference or gage battery may be representative of a sample battery having characteristics within acceptable accuracy, reproducibility and repeatability ranges. Like above, when the charge stored on the charge-transfer part 110 equals or falls below the minimum charging level of the reference or gage battery, the detector module 108 detects a condition that indicates that the battery 112 cannot be charged.

The charging-and-detection architecture 100 may also include an indicator module 114 for indicating when the charging signal satisfies the predetermined threshold. The indicator module 114 may be deployed as an illuminating indicator, which can illuminate when the charging signal satisfies the predetermined threshold. The illuminating indicator, however, may illuminate when the charge signal does not satisfy the predetermined threshold, and then when the charge signal satisfies the predetermined threshold, the indicator may dim.

The indicator module 114 may also be deployed as an audible indicator, a combination of audible and illuminating indicator, a user interface, or other indicating device. The indicator may be employed in a network scheme, for instance. In one such scheme, the charging-and-detection architecture 100 may be integrated or integral to one or more network devices so as to allow a central, remote and/or distributed network of devices indicate that the battery 112 is defective and/or missing. Such a scheme may enable real-time or near-real-time detection of a missing or defective battery.

Figure 2:
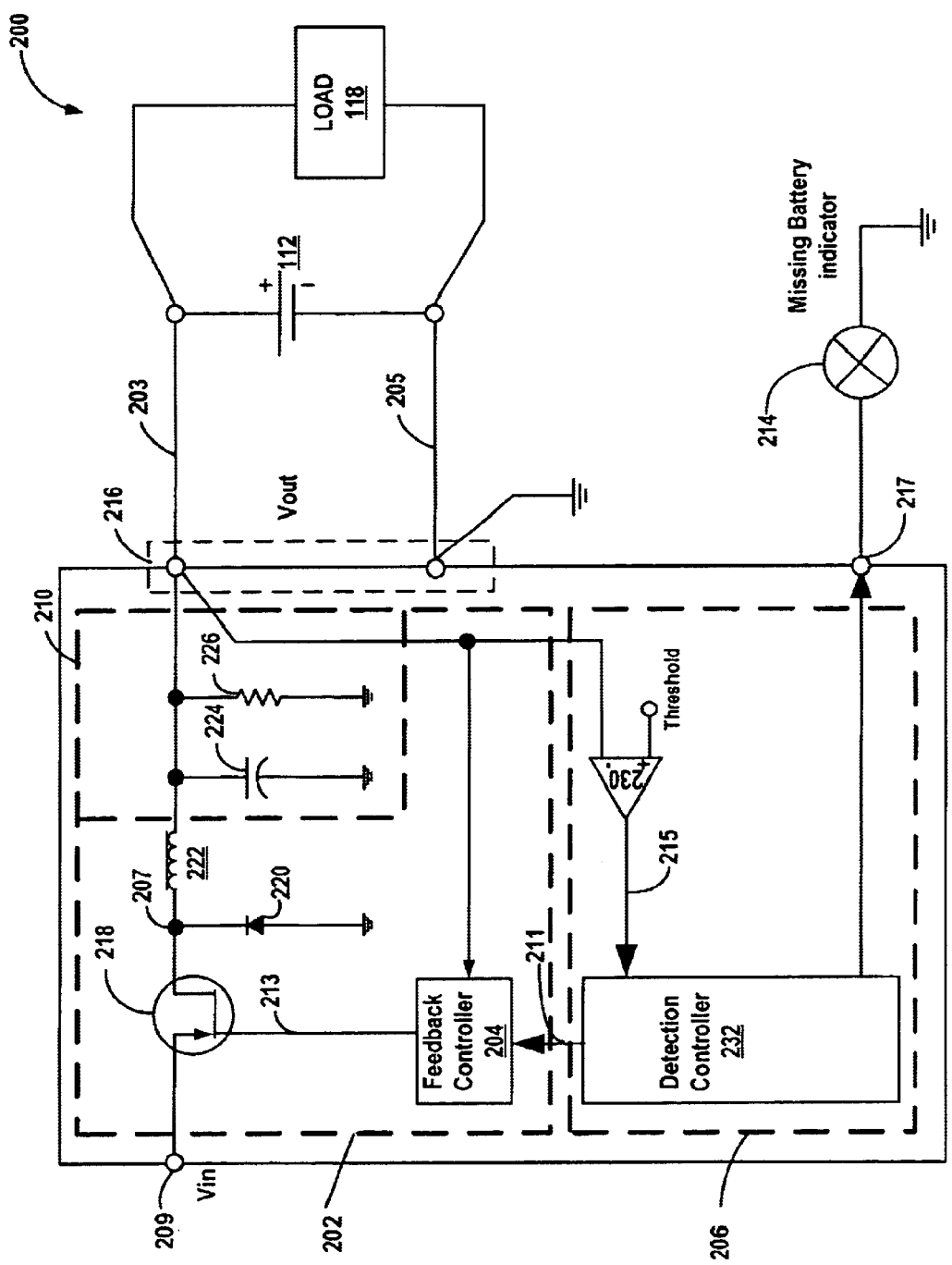
FIG. 2 is a second block diagram illustrating other exemplary charging-and-detection architecture that may be used for detecting battery removal, battery absence and/or defective battery conditions in various battery charging and testing systems and methods.

Referring now to FIG. 2 is a second block diagram illustrating another exemplary charging-and-detection architecture 200 is shown. This exemplary charging-and-detection architecture 200 may be used in or with battery charging and testing systems and methods for detecting battery removal, battery absence and/or defective battery conditions.

The charging-and-detection architecture 200 is similar to the charging-and-detection architecture 100 shown in FIG. 1, except as described herein. The charging-and-detection architecture 200 may use a power supply 202, a feedback module 204, a combination detection-and-controller module 206, and a missing or defective battery indicator 214 for detecting battery removal, battery absence and/or defective battery conditions.

The power supply 202 may be capable of sourcing from between a high-side supply conductor 203 and a low-side supply or ground conductor 205 a charging signal having a positive voltage $V_{in}$ and a corresponding input current. For example, the power supply 202 can be configured to supply enough current at a nominal voltage so as to maintain the high-side supply conductor 203 at a system reference potential or nominal voltage and the low-side supply conductor 205 at a low-side reference potential and/or earth ground. The system reference potential or nominal voltage may vary in response to the feedback regulation as will be described in more detail below.

The power supply 202 may be deployed as a DC-DC converter having a charge-transfer part 210 (as shown), a transformer and rectifier bridge combination, a switching power supply and/or other voltage rectification and regulation components as known in power source regulation. Alternatively, instead of being sourced by traditional power source regulation components, an electrical signal may be supplied to the charge-transfer part 210 by a microprocessor, and/or other analog or digital source (not shown). For instance, two output pins of the microprocessor may be configured to source the electrical signal to cause the charge-transfer part 210 to supply the charging signal. The power supply 202 may also include various additional switches and circuits for achieving desired safety, timing, and sequencing functions.

In a DC-DC converter embodiment, the power supply 202 may include a step down regulator configured in a standard buck-type configuration. In this standard buck-type configuration, the regulator includes a switch 218, a rectifier 220, an inductor 222, the feedback controller 204, and (v) the charge-transfer part 210.

The switch 218 may be constructed from semiconductor-based elements, and/or any other switching elements that allow for a variable duty ratio. Accordingly, the construction of the switch 218 may use discrete, monolithic and/or hybrid components and technologies. Thus, the architecture of the switch 218 may include one or more metal oxide semiconductor field effect transistors (MOSFETs), one or more junction field effect transistors (JFETs), one or more bipolar-junction transistors (BJTs), and/or (v) any other monolithic, discrete or hybrid switches capable of switching at various frequencies.

Feedback signals may be used to control the duty cycle of the switch 218 (i.e., the fraction of time the switch is a conducting state over a given switching cycle). These control signals may be supplied by the feedback controller 204, and may be implemented using signal generators, such as pulse-width-modulation signal generators, pulse-frequency-modulation signal generators, and/or feedback-controlled or hysteretic signal generators, and/or microprocessor timing controls. Accordingly, the control signals may be pulse-width modulated control signals, pulse-frequency-modulated control signals, hysteretic control signals, and/or other signals that may vary in magnitude, shape and frequency, respectively.

The rectifier 220 couples in a reverse bias orientation from between node 207 to the ground conductor 205. This orientation allows forward bias current to flow from the ground conductor 205 to the node 207. The architecture of rectifier 220 may include (i) one or more diodes; (ii) one or more synchronous rectifiers, which may be constructed from one or more enhancement or depletion mode NMOS or PMOS transistors; and/or (iii) any other discrete, monolithic or hybrid rectifier having the ability to switch from a conducting state to a non-conducting state at various frequencies. In one exemplary embodiment, the switch 218 and the rectifier 220 may be both constructed from the same type topology, e.g., the same NMOS or PMOS material.

The inductor 222 couples node 207 to the charge-transfer part 210. The inductor 222 may be fabricated as a thin-film inductor or a monolithic or discrete, coil or spiral wire-wound inductor. The inductor 222 may be packaged in (i) a hermetically-sealed (e.g., ceramic encased) leaded package, (ii) a hermetically-sealed surface mount form, and/or (iii) a flip chip form. The inductor 222 may be similar to the types of inductors commonly used in switching power supplies and/or radio frequency (RF) type circuits.

In one embodiment, the charge-transfer part 210 may be constructed from a capacitor 224 and a resistor 226. The charge-transfer device 210, however, may take other forms. The architecture of the capacitor 224 may include a coupling capacitor having a storage capacity of approximately a few thousand microfarads and below. The capacitor 224 may be formed as a monolithic, discrete and/or hybrid capacitor, which may be packaged in (i) a hermetically-sealed (e.g., ceramic or tantalum encased) leaded package, (ii) a hermetically-sealed surface mount form, and/or (iii) a flip chip form. The resistor 226 may be fabricated as a thick film resistor, or a monolithic, discrete and/or hybrid resistor, e.g., a carbon based resistor. The resistor 226 may be packaged in (i) a hermetically-sealed (e.g., ceramic encased) leaded package, (ii) a hermetically-sealed surface mount form, and/or (iii) flip chip form.

The inductor 222, capacitor 224, and resistor 226 are available from such suppliers as Murata Electronics North America, Inc., having offices at Corporate Headquarters 2200 Lake Park Drive, Smyrna, Ga. 30080-7604 U.S.A.; Bourns Inc., having offices at 1200 Columbia Avenue, Riverside, Calif. 9250, U.S.A.; CoilCraft having offices at 1102 Silver Lake Road, Cary Ill. 60013, U.S.A.; US Microwaves A Division Of Semiconix Corporation having offices at 2964-2966 Scott Blvd Santa Clara, Calif. 95054, U.S.A.; Toko America, Inc. having offices at 1250 Feehanville Drive Mt. Prospect, Ill. 60056, U.S.A.; Kyocera America, Inc. having offices at 8611 Balboa Ave. San Diego, Calif. 92123-1580, U.S.A.

Each of these suppliers can provide (i) high accuracy, high Q inductors, (ii) high accuracy, and low dissipating capacitors and (iii) high accuracy, high-tolerance resistors for high frequency as well as power applications. Other capacitor, inductor, and resistor materials and types, and other manufacturers may be used as well.

The charge-transfer part 210 may be coupled to a battery-terminal interface 216, which supplies the charging signal (i.e., an output voltage and output current) that may be used to charge the battery 112. The charging signal may have an output power ranging from approximately 0.1 W watt to 500 watts. The output power, however, may be greater than or less than this exemplary range.

The amount of charging signal supplied to the battery-terminal interface 216 may be based on a duty ratio of the DC-DC converter (i.e., the ratio of output voltage to input voltage). In one alternative, the value of input voltage may be selected by starting with the desired output voltage and multiplying it by the inverse of a selected duty ratio. Similarly, the value of the corresponding input current may be selected by starting with the desired output current and multiplying it by the duty ratio. Other functions may be used for determining the value of the input voltage and corresponding input current, as well.

The combination detection-and-controller module 206 provides a detection and control mechanism to complement the charging mechanism provided by the power supply 202. This detection and control mechanism may control the feedback controller 204 so as to cause the power supply 202 (via the charge-transfer part 210) to interrupt or temporarily suspend supplying the charging signal to the battery terminal interface 216.

The combination detection-and-controller module 206 is provided as a combination to aid in the understanding of the present embodiment. It should be noted, however, that each architectural component and the functions carried out by this module 206 may be deployed in a standalone, integrated or integral form.

In one exemplary embodiment, the architecture of the combination detection-and-controller module 206 may include a charging-signal comparator 230 for detecting whether the charging signal satisfies the predetermined threshold. The combination detection-and-controller module 206 may alternatively deploy other thresholding architecture and circuitry for detecting when the charging signal satisfies the predetermined threshold.

The combination detection-and-controller module 206 may also include a detection controller 232 for controlling or modifying the feedback control signals provided by the feedback controller 204. The detection controller 232 may also supply an output signal (hereinafter "detection-driver signal") to trigger, drive or otherwise activate the missing or defective battery indicator 214 when the charging signal satisfies the predetermined threshold.

The charging-signal comparator 230 may be any monolithic, discrete and/or hybrid comparator as known in analog and/or digital electrical arts. The charging-signal comparator 230 may have one input coupled to node 203 to receive the charging signal, and a second input to receive a reference signal. The reference signal may be set at various levels, which in turn, set the predetermined threshold. The charging-signal comparator 230 may also have an output for supplying a threshold-detection signal to the detection controller 232. This threshold-detection signal may be used to indicate when the charging signal satisfies the predetermined threshold.

When, for example, the charging-signal comparator 230 is a linear comparator, the threshold-detection signal may be defined by one set of voltages and/or currents when the charging signal satisfies the predetermined threshold, and another set of voltages and/or currents when the charging signal does not satisfy the predetermined threshold. Alternatively, the charging-signal comparator 230 may be a thresholding comparator, such as Schmitt trigger. As such, the charging-signal comparator 230 may output the threshold-detection signal in a step-function format having at least two discrete states. One state may signify that the charging signal satisfies the predetermined threshold. Another state may signify that the charging signal does not satisfy the predetermined threshold.

Figure 3A:
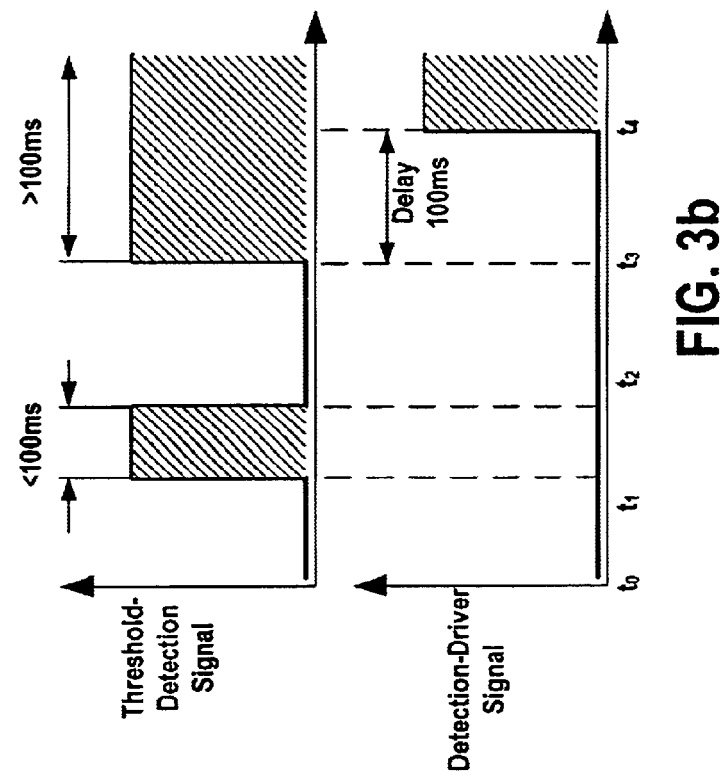
FIG. 3a is a third block diagram illustrating exemplary controller architecture for one or more of the exemplary charging-and-detection architectures.
Figure 3B:
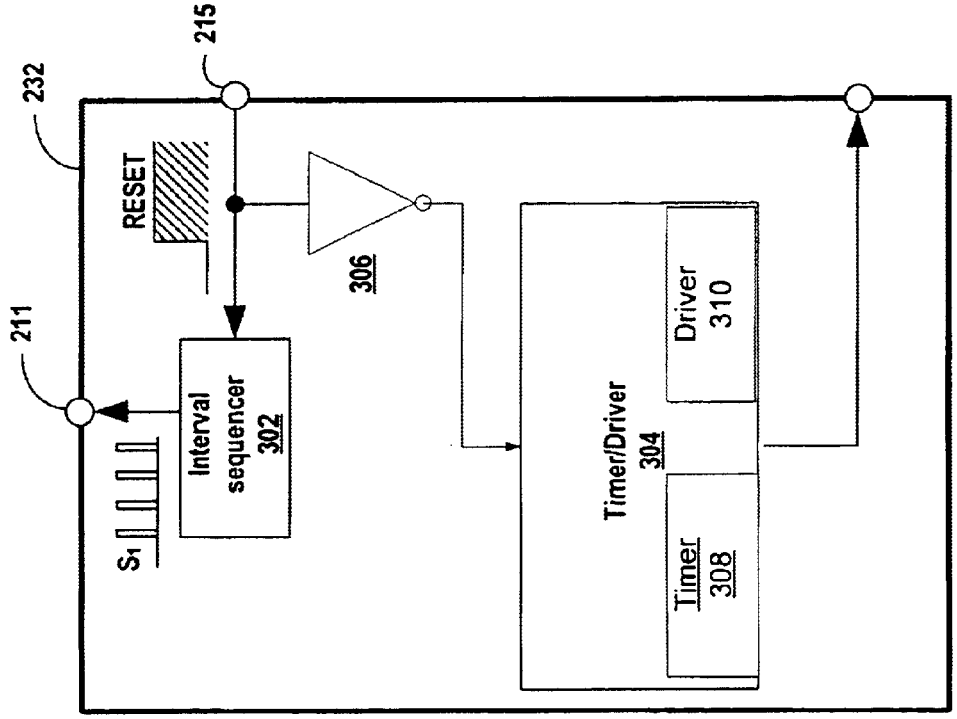

Referring now to FIG. 3*a*, a more detailed block diagram illustrating the detection controller 232 for one or more of the exemplary charging-and-detection architectures is shown. In FIG. 3*b*, timing diagrams illustrating exemplary threshold-detection and detection-driver signals that can be used in conjunction with the detection controller 232 are shown. For convenience, the threshold-detection signal is shown as a step function, rather than a linear, proportional, or other format signal.

The detection controller 232 may be deployed with an interval sequencer 302, a timer/driver 304 and a signal inverter 306. Like the detection controller 232 as a whole, the interval sequencer 302, timer/driver 304, and signal inverter 306 may be constructed using any monolithic, discrete and/or hybrid component and/or technique.

The interval sequencer 302 may have (i) an output for supplying to the feedback controller 204 an interrupt signal and (ii) an input for receiving the threshold-detection signal from the charging-signal comparator 230. The interrupt signal that is output to the feedback controller 204 by interval sequencer 302 may be a periodic-pulse-type waveform. As shown in FIG. 3a labeled "S1," the periodic-pulse-type interrupt signal generated by the interval sequencer 302 may have, for example, a timing signature in which multiple pulse-width signals are periodically issued. The interrupt signal may use other timing signatures as well.

During each pulse of the periodic-pulse-type interrupt signal, the interval sequencer 302 causes the feedback controller 204 to turn off the switch 218, which in turn causes the charge-transfer part 210 to discharge. After each pulse, however, the interrupt signal provided from interval sequencer 302 will allow the feedback controller 204 to return to regulating the charging signal. The interval sequencer 302 will continue to generate the interrupt signal unless it is reset by the threshold-detection signal.

If the threshold-detection signal becomes active and resets the interval sequencer 302, instead of allowing the feedback module 204 return to regulating the charging signal, the interval sequencer 302 may cause the feedback controller 204 to maintain or force the switch 218 into an OFF state. This allows the charge-transfer part 210 to further discharge.

Referring now to FIG. 3b, when the threshold-detection signal is in a low state, such as the period shown between $t_0$ and $t_1$, the interval sequencer 302 outputs the periodic-pulse-type interrupt signal. When the threshold-detection signal transitions at time $t_1$ to a high state because the charging signal has satisfied the predetermined threshold, the interval sequencer 302 resets. This in turn causes the interval sequencer 302 to issue to the feedback controller 204 a signal to turn off the switch 218. With the switch in the OFF state, the charge-transfer part 210 can further discharge. When the threshold-detection signal at time $t_2$ returns to a low state because the charging signal no longer satisfies the predetermined threshold, the interval sequencer 302 returns to outputting the periodic-pulse-type interrupt signal.

Referring back to FIG. 3a, the signal inverter 306 in addition to the interval sequencer 302 may have an input coupled to node 215 for receiving the threshold-detection signal. The signal inverter 306 may also have an output to provide to the timer/driver 304 an inverted threshold-detection signal.

While the signal inverter 306 may provide a design feature useful preventing false detection in the case of a circuit failure, it, however, may be omitted from the detection controller 232. As known in the electrical arts, other design features and choices may be used to avoid false detection and enhance the detection functionality.

If the signal inverter 306 is deployed, the timer/driver 304 may have an input for receiving the inverted threshold-detection signal from the signal inverter 306. Otherwise, the input of the timer/driver 304 may be configured to receive the threshold-detection signal (inverted or not) directly from the charging-signal comparator 230 or other device (not shown). The timer/driver 304 may also have an output that provides the detection-driver signal for driving the missing or defective battery indicator 214.

The detection-driver signal output from the timer/driver 304 may have at least two discrete states, e.g., a high state and a low state, as shown on FIG. 3b. When the detection-driver signal is in the high state, for example, the timer/driver 304 may cause the missing or defective battery indicator 214 to activate. The timer/driver 304 may provide the high state detection-driver signal when the charging-signal comparator 230 provides a threshold-detection signal that indicates that the charging signal has satisfied the predetermined threshold (hereinafter "active-threshold-detection signal").

Alternatively, the timer/driver 304 may provide the high state threshold-detection signal only after the active-threshold-detection signal indicates that the charging signal has satisfied the predetermined threshold for a given duration of time. In doing so, the timer/driver 304 enhances the detection-and-control architecture 200 immunity to undesirable noise.

For example, when the threshold-detection signal transitions to a high state at time $t_1$, the timer/driver 304 receives an inverted copy of the signal. Responsive to this signal, timer circuitry 308 of the timer/driver 304 is triggered, but the timer/driver does not issue a detection-driver signal to activate the missing or defective battery indicator 214. As the timer circuitry 308 counts, either decrementing from or incrementing toward a pre-selected timer value, the timer/driver 304 continues to output a detection-driver signal that does not activate the missing or defective battery indicator 214 (hereinafter "inactive-detection-driver signal").

Before the timer circuitry 308 reaches the pre-selected timer value at time $t_2$, the threshold-detection signal transitions to a low state causing the timer circuitry 308 to reset for the next transition to a high state. Responsive to being reset, the timer/driver 304 continues to output the inactive-detection-driver signal. Thus, undesirable, stray and/or intermittent signals received by the detection-and-control module 206 or its components do not inadvertently trigger the timer/driver 304 to output a detection-driver signal that activates the missing or defective battery indicator 214.

At time $t_3$, the threshold-detection signal transitions again to a high state, which causes the timer circuitry 308 to again count toward the pre-selected timer value. This time, however, the threshold-detection signal remains at the high state for a period longer than the pre-selected timer value. After the timer circuitry 308 reaches the pre-selected timer value at time $t_4$, driver circuitry 310 of the timer/driver 304 outputs a detection-driver signal to activate the missing or defective battery indicator 214 (hereinafter, "active-detection-driver signal"). The missing or defective battery indicator 214 may use this active-detection-driver signal to provide audio or visual alert to indicate that the battery 112 is missing or defective.

2. Exemplary Operation of Charging-and-Detection Architectures

FIG. 4 is a flow chart illustrating an exemplary flow 400 for carrying out an operation of the charging-and-detection architectures in accordance with an exemplary embodiment. The flow 400 may be accomplished using the processes of (i) performing charging signal regulation 410, (ii) interrupting or temporarily suspending charging signal regulation 420, and (iii) detecting and indicating missing or defective battery conditions 430.

The following describes an exemplary embodiment for carrying out the flow 400 using the exemplary charging-and-detection architecture 200 shown in FIGS. 2 and 3a. The flow 400, however, may be carried out using other charging-and-detection architectures.

A. Performing Charging Signal Regulation

Referring now to FIG. 2, the operation of the power supply 202 to provide a regulated charging signal to the battery terminal interface 216 may be accomplished using a DC-DC converter embodiment. The DC-DC converter may provide the charging signal in the form of voltage regulation. That is, the power supply 202 may convert a $V_{in}$ signal from a DC input source (not shown) so as to supply a voltage $V_{out}$ to the battery terminal interface 216, and in turn, the battery 112 and/or load 118, if connected.

The following depicts one exemplary embodiment of how the power supply 202 may provide voltage regulation. The power supply 202 may perform voltage regulation in other ways as well. As a starting point, each time the switch 218 is in an ON state, the difference between $V_{in}$ supplied between node 209 and the ground connection 205, and an output voltage $V_{out}$ supplied between battery-terminal interface 216 appears across inductor 222, which causes the current exiting the node 207 to increase linearly through the inductor 222.

When the output voltage $V_{out}$ reaches a desired or predetermined value, the feedback controller 204 senses a change in the output voltage $V_{out}$ and adjusts the feedback control signals, e.g., the duration of the pulse width modulation signals, to the switch 218, accordingly. This adjustment may cause the switch 218 to change from an ON state to an OFF state.

If the rectifier 220 is a synchronous rectifier, within a short delay period, the feedback controller 204 may adjust feedback control signals, e.g., the duration of the pulse width modulation, to the rectifier 220. This may cause the rectifier 220 to switch from an OFF state to an ON state. The delay period may be set to obtain optimal performance and efficiency. Additionally, the delay period may depend on the physical characteristics of the switch 218, the rectifier 220, and the feedback controller 204.

If, on the other hand, the rectifier 220 is a diode (e.g., as a Schottky diode), the switching characteristics of the diode determines the amount of delay after switch 218 is turned to the OFF state. In an exemplary embodiment, the delay period for switching such diode should be comparable to the delay period of the synchronous rectifier.

Immediately after the switch 218 switches to the OFF state, the inductor current "freewheels" through the rectifier 220, the charge-transfer part 210 and any load coupled to the battery-terminal interface 216. This may include the load 118 and battery 112 being charged. More specifically, once the switch 218 turns off, the voltage across the rectifier 220 becomes negative and when the rectifier 220 reaches the forward bias voltage drop, it is simultaneously switched (or if the rectifier 220 is embodied as a diode, switches) from an OFF state to an ON state.

Thereafter, the energy stored in the inductor 222 begins to decrease as current flows to charge-transfer part 210 (e.g., the capacitor 224 and resistor 226), battery 112 and load 118. Depending on the load conditions, the charge in the charge-transfer part 210, e.g., the charge on capacitor 224, will discharge through any connected load until the voltage on node 203 begins to decrease.

Thereafter, the feedback controller 204, which may include a pulse-width modulated controller, may then compare the output voltage $V_{out}$ to a predetermined reference value to generate an error-voltage signal. If this error-voltage signal meets a predetermined-regulation threshold, the feedback controller 204 may trigger the switch 218 to switch from the OFF state to the ON state before the voltage on node 203 decreases any significant amount. In a pulse-width modulator-type feedback module, the trigger may be carried out by a ramp-generator signal in conjunction with the error voltage signal, as is known in pulse-width-modulated controllers.

If, however, the feedback controller 204 is interrupted, temporarily suspended or otherwise not allowed to provide uninterrupted feedback control signals, it will cause the switch 218 to switch to and remain in the OFF state during such interruption. This allows the charge in the charge-transfer device 210 to discharge through any connected load, such as the resistor 226, load 118 and battery 112.

B. Interupting or Temporarily Suspending Charging Signal Reguation

To facilitate interrupting, temporarily suspending or otherwise cause the feedback controller 204 to provide interrupted feedback control signals, the detection controller 232 (via the interval sequencer 302 and the charging-signal comparator 230) supplies to the feedback controller 204 the interrupt signal. As noted, the interrupt signal may be a periodic-pulse-type interrupt signal. Thus, the feedback controller 204 may force the switch 218 to the OFF state during each pulse. In turn, some or all of the charging signal stored in the capacitor 224 of the charge-transfer part 210 discharges through the coupled load.

The amount and/or rate of discharge may depend upon the load coupled to the capacitor 224. When the resistor 226, battery 112, and load 118 are all coupled to the capacitor 224, each draw a certain amount of the charging signal. Further, the parallel impedance of each of these loads coupled together has an effect on a charging and/or discharging time constant of the charge-transfer part 210. If, however, one or more of the loads, such as the battery 112, is removed, the amount of charging signal drawn and the magnitude of time constant changes. These changes may be detected by the detection-and-controller module 206.

C. Detecting and Indicating Missing or Defective Battery Conditions

As the charge-transfer part 210 discharges its stored charging signal, the charging-signal comparator 230 may detect, measure or otherwise determine that the charging signal is discharging. Responsively, the charging-signal comparator 230 compares the charging signal with the reference signal.

As noted, the reference signal effectively sets the predetermined threshold that indicates when the battery 112 is missing or defective. When the battery 112 is coupled to the battery-terminal interface 214 and not defective, the charging signal detected by the charging-signal comparator 230 does not satisfy the predetermined threshold. Consequently, the charging-signal comparator 230 does not supply to the detection controller 232 the active-threshold-detection signal. Responsively, or in due course, the detection controller 232, via the interval sequencer 302, allows the feedback controller 204 to return to charging-signal regulation.

If, on the other hand, the battery 112 is removed, not coupled and/or defective, the charging signal detected by the charging-signal comparator 230 may satisfy the predetermined threshold. In response to satisfying the predetermined threshold, the charging-signal comparator issues to the detection controller 232 the active-threshold-detection signal. The detection controller 232, via the interval sequencer 302, then triggers the feedback controller 204 to force the switch 218 to turn or remain off. This, in turn, allows the charging signal stored on the charge-transfer part 210 to further discharge. The detection controller 232 may also issue to the indicator module 214 active-detection-driver signal to drive the indicator module 214 active so as to indicate that the battery 112 is missing or defective.

When deployed with the timer/driver 304, the detection controller 232 may trigger the timing circuitry 308 of the timer/driver 304 instead of issuing to active-detection-driver signal. If the threshold-detection signal remains active after the timer circuitry 308 times out, then the driver circuitry 310 of the timer/driver 304 may issue to the indicator module 214 the active-detection-driver signal to drive the indicator module 214 active, thereby indicating the battery 112 is missing or defective.

Figure 5:
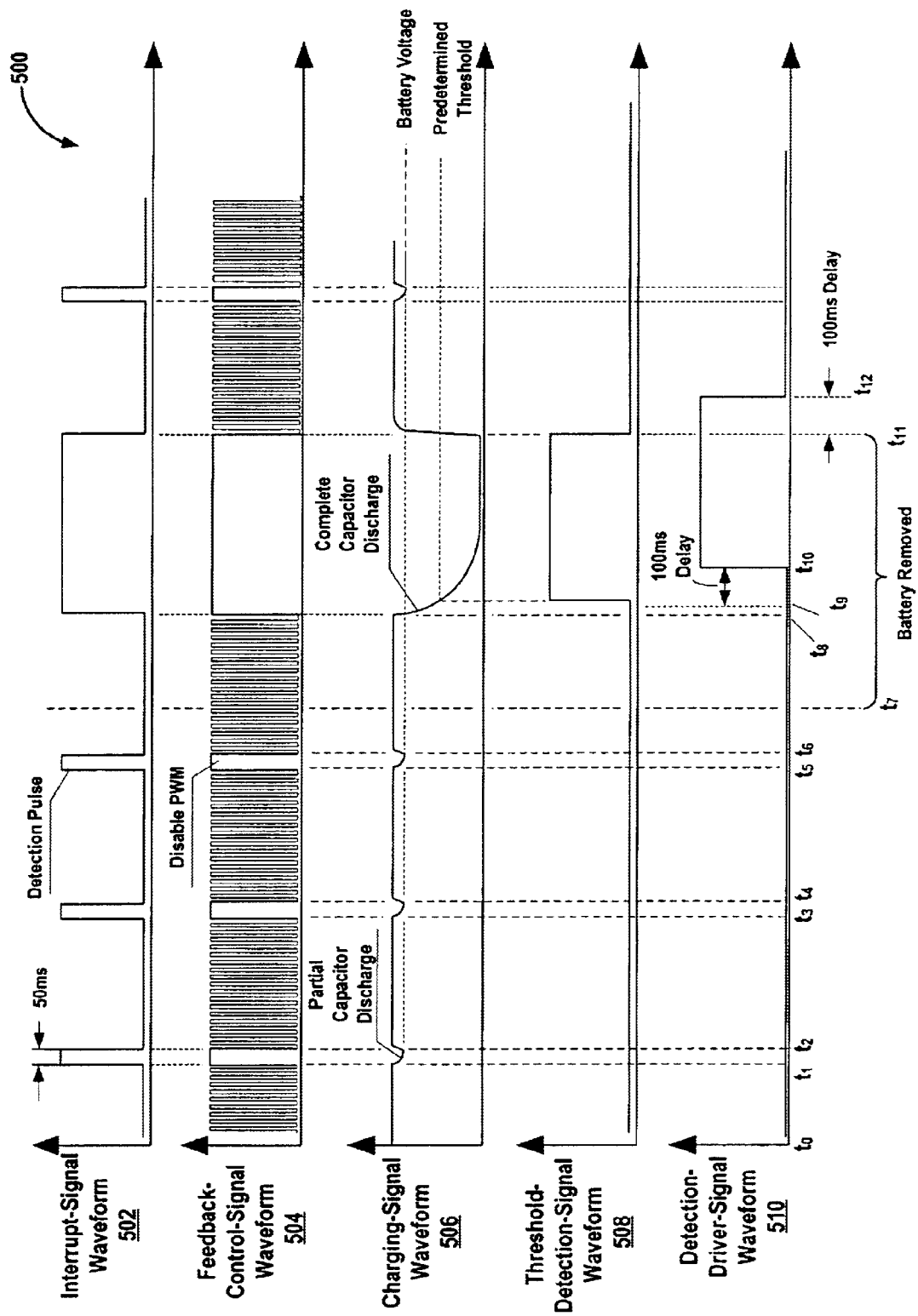
FIG. 5 is a second timing diagram illustrating a plurality of waveforms for describing an exemplary operation of one or more exemplary charging-and-detection architectures.

Referring now to FIG. 5, a timing diagram 500 illustrating a plurality of waveforms for describing an exemplary operation of an exemplary charging-and-detection architecture, such as the charging-and-detection architecture 200 (FIG. 2), is shown. Included in these waveforms are (i) an interrupt signal waveform 502, (ii) a feedback-control-signal waveform 504, (iii) a charging-signal waveform 506, (iv) a threshold-detection-signal waveform 508, and (v) a detection-driver-signal waveform 510.

Each of these waveforms 502–510 may be detected on at least one node and/or signal path of the charging-and-detection architecture 200. For instance, the interrupt-signal waveform 502 may be detected on a signal path 211, which is between the detection controller 232 and the feedback controller 204. The feedback-control-signal waveform 504 may be detected on signal path 213, which is between the feedback controller 204 and the switch 218. The charging-signal waveform 506 may be detected on the battery-terminal interface 216. The threshold-detection-signal waveform 506 may be detected on signal path 215, which is between the charging-signal comparator 230 and the detection controller 232. And finally, the detection-driver-signal waveform 510 may be detected at node 217 to which the missing or defective battery indicator 214 is coupled.

Assume for the following description of the operation of the exemplary charging-and-detection architecture 200 that the power supply 202 contains a switching power supply, such as the standard buck-style, DC-DC converter noted above. Also assume that the feedback controller 204 is embodied as an interruptible pulse-width-modulation (PWM) controller. Further assume that the charging-signal comparator 230 may be embodied as a thresholding comparator, such as a Schmitt Trigger.

Moreover, assume that the battery 112 is embodied as a 12-Volt lead-acid-type battery and it is coupled to the battery-terminal interface 216. Typically, a fully-charged, lead-acid-type battery can supply various amounts of useful current from about 12 volts to about 8 volts. On the other hand, below about 8 volts, the usefulness of this type of battery dwindles. So, the predetermined threshold for detecting a missing or defective battery may be set at about 8 volts and below. Other factors, such as rate of charge, may factor into setting the predetermined threshold as well.

As an arbitrary starting point, the detection controller 232 issues to the feedback controller 204 a low-state interrupt signal as shown in the interrupt-signal waveform between time $t_0$ and $t_1$. During the same period, the feedback controller 204 provides PWM voltage-feedback regulation to maintain the charging signal at a predetermined voltage as shown in feedback-control-signal waveform 504 and the charging-signal waveform 506.

This predetermined voltage may vary depending on the maximum charging signal that can be applied to the battery 112. Since different batteries may have different maximum charging signals, this predetermined voltage may be set at different values for the differing batteries. In the present lead-acid-type battery example, the predetermined voltage may be set at a voltage greater than about 12 volts.

Because the charging voltage is maintained above the predetermined threshold of 8 volts, the charging-signal comparator 230 supplies to the detection controller 232 a low-state threshold-detection signal as shown in the threshold-detection-signal waveform 508. This low-state signal indicates that the charging signal has not satisfied the predetermined threshold. Consequently, detection controller 232 supplies to the missing or defective battery indicator 214 a low-state detection-drive signal indicating that the battery 112 is not missing or defective. This low-state detection-driver signal is illustrated in the detection-driver-signal waveform 510 between time $t_0$ and $t_1$.

Between time $t_1$ and $t_2$, the detection controller 232 issues to the feedback controller 204 a short, e.g., a 50 millisecond, pulse interrupt signal as shown in the interrupt-signal waveform 502. The pulse duration may be selected so that the charging process is not adversely affected, yet the duration may be long enough for (i) the capacitor 224 to discharge, and (ii) the detection and control module 206 to provide reliable voltage detection.

Responsive to the pulse of the interrupt signal, the feedback controller 204 stops providing the PWM voltage-feedback regulation, and forces the switch 218 to an OFF state, which allows the capacitor 226 of the charge-transfer part 210 to discharge through the resistor 226, battery 112 and load 118, as shown in the charging-signal waveform 506. Since the battery 112 is coupled to the battery-terminal interface 214, the charging voltage sensed by the charging-signal comparator 230 may discharge to the charge stored in the battery 112. Assuming the battery 112 is not defective, the charging voltage is maintained above the predetermined threshold of 8 volts.

Consequently, the charging-signal comparator 230 supplies to the detection controller 232 a low-state threshold-detection signal as shown in the threshold-detection-signal waveform 508 between time $t_1$ and $t_2$. As above, this low state signal indicates that the charging signal has not satisfied the predetermined threshold, which prompts the detection controller 232 to supply to the missing or defective battery indicator 214 a low-state detection-driver signal indicating that the battery 112 is not missing or defective. As above, this low-state detection-driver signal is illustrated in the detection-driver-signal waveform 510 between time $t_1$ and $t_2$.

The operation of the charging-and-detection architecture 200 that is performed between the time period $t_0$ to $t_1$ may be repeated during the time periods of $t_2$ to $t_3$, and $t_4$ to $t_5$. Similarly, the operation of the charging-and-detection architecture 200 that is performed between the time period $t_1$ to $t_2$ may be repeated during the time periods $t_3$ to $t_4$, and $t_5$ to $t_6$. Consequently the detection controller 232 may continue to supply to the missing or defective battery indicator 214 the low-state detection-drive signal indicating that the battery 112 is not missing or defective.

At time $t_7$, however, the battery 112 is decoupled or otherwise removed from the battery-terminal interface 216. Since the detection controller 232 is not interrupting the feedback controller 204 at time $t_7$, the feedback controller 204 continues to provide PWM voltage-feedback regulation to maintain the charging signal at a predetermined voltage as shown in feedback-control-signal waveform 504 and the charging-signal waveform 506.

At time t8, the detection controller 232 initially issues to the feedback controller 204 another short-pulse interrupt signal as shown in the interrupt-signal waveform 502. Responsively, the feedback controller 204 stops providing the PWM voltage-feedback regulation and forces the switch 218 to an OFF state, which allows the capacitor 226 of the charge-transfer part 210 to discharge through the resistor 226 and load 118, as shown in the charging-signal waveform

506. Since the battery 112 has been decoupled from the battery-terminal interface 216, the charging voltage may now discharge to a value below the predetermined threshold of 8 volts.

The charging signal may discharge according to a profile that is indicative of a missing or defective battery and may vary from one battery type to another. This profile may include a discharge rate and discharge amount, for instance.

In one exemplary embodiment, the profile may be defined by the values of the capacitor 224 and resistor 226. For instance, the value of the capacitor 224 may be chosen for sufficient voltage filtration and for sufficient voltage transfer during charging. The value of the resistor 226, however, may be chosen to provide sufficient discharge of the capacitor 224 during the pulse of the interrupt signal so as to cause the charging voltage to drop below the predetermined threshold regardless of coupled load 118.

Using the following equations, the value of the resistor 224 can be determined. To begin with, the voltage across the capacitor 224 during discharge can be calculated by the equation:

$$V_c = V * e^{\frac{-t}{RC}} \quad \text{(Eq. 1)}$$

where, "Vc" is the voltage across the capacitor 224, "V" is the initial capacitor voltage, "t" is the duration of the pulse of the interrupt signal, "R" is the value of the resistor 226, and "C" is the value of the capacitor 224. Next, set Vc to the predetermined threshold and set V to the desired charging voltage that is to be supplied to the battery-terminal interface 216. Equation 1 can be re-arranged into the following equation:

$$R \leq \frac{-t}{\ln\left(\frac{V_{thr}}{V}\right) * C} \quad \text{(Eq. 2)}$$

Solving equation 2 yields the value of the resistor 226. By way of non-limiting example, the value of the resistor 226 may be:

$$R \leq \frac{-50 * 10^{-3}}{\ln\left(\frac{8}{15}\right) * 100 * 10^{-6}} = 795 \, \Omega$$

for a lead-acid 12-volt battery, where (i) the pulse of the interrupt signal is about 50 milliseconds, (ii) the predetermined threshold is about 8 volts, (iii) the desired charging signal is about 15 volts, and (iv) the capacitor 224 is about 100 microfarads.

In this example, the 795 ohm value provides a sufficient path to discharge the capacitor 224 below the predetermined threshold regardless of whether the load 118 is coupled to the battery-terminal interface. The discharge time of the capacitor 224, however, may be shorter when both the resistor 224 and load 118 are coupled to the capacitor 224 because the load 118 provides an additional path for the charging voltage to discharge.

Referring again to FIG. 5 at time $t_9$, sensing that the charging voltage has fallen below the predetermined threshold, the charging-signal comparator 230 supplies to the detection controller 232 a high-state threshold-detection signal as shown in the threshold-detection-signal waveform 508. This high-state threshold-detection signal indicates that the charging signal has satisfied the predetermined threshold. Responsive to the high-state threshold-detection signal, the interval sequencer 302 of the detection controller 232 resets, thereby extending the duration of the interrupt signal pulse. The duration of the interrupt pulse may continue to increase provided that the threshold-detection signal remains in the high state.

In addition to feeding the interval sequencer 302, the charging signal comparator 230 also feeds the high-state threshold-detection signal to the signal inverter 306. The signal inverter 306 inverts the high-state threshold-detection signal and supplies it to the timer/driver 304 to trigger the timer circuitry 308. The timer circuitry 308 counts, either decrementing from or incrementing toward, the pre-selected timer value.

This pre-selected timer value may be set at a value equal to or greater than the pulse of the interrupt signal. As noted above, the pre-selected timer value may also be set a value that prevents inadvertent triggering of the missing or defective battery indicator 214. For example, if the pulse width of the interrupt signal pulse is, for example, 50 milliseconds, the pre-selected timer value may be set at about 100 milliseconds.

While the timer circuitry 308 counts, the driver circuitry 310 of the timer/driver 304 continues to output a low-state or inactive-detection-driver signal as shown in the detection-driver-signal waveform 510 between time $t_9$ and $t_{10}$. At time $t_{10}$, the timer circuitry 510 reaches the pre-selected timer value as shown in the detection-driver-signal waveform 510. Consequently, the driver circuitry 310 of the timer/driver 304 issues to the missing or defective battery indicator 214 a high-state or active-detection-driver signal as shown in the detection-driver-signal waveform 510 at time $t_{10}$. This causes the missing or defective battery indicator 214 to indicate that the battery 112 is missing or defective. The missing or defective battery indicator 214 will continue to indicate that the battery 112 is missing or defective until shortly after battery 112 is re-coupled or a good battery is coupled to the battery terminal interface 216.

Soon after the battery 112 is re-coupled to the battery-terminal interface 216 at time $t_{11}$, the power supply 202 starts re-supplying the charging voltage, and the feedback controller 204 begins to provide PWM voltage-feedback regulation to maintain the charging signal at a predetermined voltage as shown in feedback-control-signal waveform 504 and the charging-signal waveform 506.

Because the charging voltage is maintained above the predetermined threshold, the charging-signal comparator 230 supplies to the detection controller 232 a low state threshold-detection signal as shown in the threshold-detection-signal waveform 508 at just after $t_{11}$. With the change in the threshold-detection-signal from the high-state to the low-state, the timer circuitry 310 begins a new counting cycle, either decrementing from or incrementing toward, the pre-selected timer value.

Consequently, detection controller 232 continues to supply to the missing or defective battery indicator 214 a high-state detection-driver signal indicating that the battery 112 is missing or defective as illustrated in the detection-driver-signal waveform 510 between time $t_{11}$ and $t_{12}$. At time $t_{12}$, the timer circuitry reaches the pre-selected timer value as shown in the detection-driver-signal waveform 510. The driver circuitry 310, in turn, issues to the missing or defective battery indicator 214 a low-state detection-driver signal. This causes the missing or defective battery indicator 214 to indicate that the battery 112 is not missing or defective. The missing or defective battery indicator 214 will continue to indicate that the battery 112 not missing or defective until shortly after the battery 112 is decoupled form the battery terminal interface 216 or until it fails.

CONCLUSION

In the foregoing detailed description, numerous specific details are set forth in order to provide a thorough understanding of exemplary embodiments described herein. However, it will be understood that these embodiments may be practiced without the specific details. In other instances, well-known methods, procedures, components and circuits have not been described in detail, so as not to obscure the following description.

Further, the embodiments disclosed are for exemplary purposes only and other embodiments may be employed in lieu of or in combination with of the embodiments disclosed. Moreover, the foregoing described systems and methods with respect to battery charging and testing system or "battery chargers," "battery testers" and/or a combination thereof. It should be noted however, that the apparatus and method described herein are not limited to battery chargers, battery testers or a combination thereof.

Moreover, it is contemplated that the above-described apparatus and components may be fabricated using Silicon/Gallium Arsenide (Si/GaAs), Silicon/Germanium (SiGe), and/or Silicon/Carbide (SiC) fabricating techniques. Included amongst these techniques are Complementary Metal Oxide Semiconductor (CMOS) fabrication processes, Bipolar Complementary Metal Oxide Semiconductor (BiCMOS) fabrication processes, Heterojunction Bipolar Transistor (HBT) fabrication processes, and/or Metal Semiconductor Field Effect Transistor (MESFET) fabrication processes.

The exemplary embodiments described herein may be deployed in various vehicles, equipment, and other devices, which may include or be utilized with any appropriate voltage source, such as a battery, an alternator and the like, providing any appropriate voltage, such as about 12 Volts, about 24 Volts, about 42 Volts and the like.

Further, the embodiments described herein may be used with any desired system or engine. Those systems or engines may comprises items utilizing fossil fuels, such as gasoline, natural gas, propane and the like, electricity, such as that generated by battery, magneto, solar cell and the like, wind and hybrids or combinations thereof. Those systems or engines may be incorporated into other systems, such as an automobile, a truck, a boat or ship, a motorcycle, a generator, an airplane and the like.

In the embodiments described above, the devices and systems may include computing systems, controllers, and other devices containing processors. These devices may contain at least one Central Processing Unit ("CPU") and a memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system.

Exemplary embodiments have been illustrated and described. Further, the claims should not be read as limited to the described order or elements unless stated to that effect. In addition, use of the term "means" in any claim is intended to invoke 35 U.S.C. §112, 6, and any claim without the word "means" is not so intended.

I claim:

1. An apparatus comprising:
   a regulator including a charge-transfer part that is operable to supply a charging signal to a battery;
   a feedback module that is operable to provide to the regulator feedback for regulating the charging signal, wherein the feedback corresponds to a charging-signal effect on a charged stored in the battery;
   a controller for interrupting the feedback module so as to cause the regulator to suspend supplying the charging signal to allow the charge-transfer part to discharge for a predetermined period of time; and
   a detector module for detecting whether during the predetermined period a charge stored on the charge-transfer part satisfies a predetermined threshold, wherein when the charge stored on the charge transfer part satisfies the predetermined threshold, the detector module detects at least one condition that indicates that the battery cannot be charged.

2. The apparatus of claim 1, further comprising a load coupled to the regulator.

3. The apparatus of claim 1, wherein the charge-transfer part is operable to supply the charging signal in excess of a charge stored in the battery.

4. The apparatus of claim 1, wherein the predetermined threshold is set at a value below a pre-selected minimum charging level of the battery.

5. The apparatus of claim 4, wherein when the charge stored on the charge transfer part falls below the predetermined threshold, the detector module detects at least one condition that indicates that the battery cannot be charged.

6. The apparatus of claim 1, wherein the predetermined threshold is set at a value approximately equal to a minimum charging level of a reference battery.

7. The apparatus of claim 6, wherein when the charge stored on the charge transfer part falls below the predetermined threshold, the detector module detects at least one condition that indicates that the battery cannot be charged.

8. The apparatus of claim 1, wherein the predetermined threshold is set at a value equal to a minimum charging level of a reference battery.

9. The apparatus of claim 8, wherein when the charge stored on the charge transfer part falls below the predetermined threshold, the detector module detects at least one condition that indicates that the battery cannot be charged.

10. The apparatus of claim 1, further comprising an indicator module for indicating when the charge stored on the charge-transfer part satisfies the predetermined threshold.

11. The apparatus of claim 10, wherein the indicator module comprises an illuminating indicator, wherein when the charge stored on the charge-transfer part satisfies the predetermined threshold, the illuminating indicator illuminates.

12. The apparatus of claim 10, wherein the indicator module comprises an illuminating indicator, wherein when the charge stored on the charge-transfer part does not satisfy the predetermined threshold, the illuminating indicator illuminates.

13. The apparatus of claim 10, wherein the indicator module comprises an illuminating indicator, wherein when the charge stored on the charge-transfer part does not satisfy the predetermined threshold, the illuminating indicator illuminates.

14. The apparatus of claim 1, wherein the condition that indicates that the battery cannot be charged comprises a condition indicating that the battery is absent.

15. The apparatus of claim 1, wherein the condition that indicates that the battery cannot be charged comprises a condition indicating that the battery is defective.

16. The apparatus of claim 1, wherein the regulator comprises any of a DC-DC converter, a transformer and rectifier bridge combination, a switching power supply, a voltage rectification and regulation component, a microprocessor, and analog or digital sources capable of supplying the charging signal.

17. The apparatus of the claim 1, wherein the feedback module comprises any of a pulse-width-modulation signal generator, pulse-frequency-modulation signal generator, feedback-controlled generator, hysteretic signal generator, and microprocessor timing controller.

18. The apparatus of claim 1, wherein the detector module and controller are combined so as to form a detection-and-control module.

19. The apparatus of claim 18, wherein the detection-and-control module comprises:

a comparator for detecting when the charging signal satisfies the predetermined threshold and for responsively providing a threshold-detection signal; and a detection controller having an interval sequencer for interrupting the feedback module and a timer/driver for providing a detection-driver signal indicating that the battery cannot be charged, wherein the interval sequencer continuously interrupts the feedback module in response to the threshold-detection signal, and wherein the timer/driver provides the detection-driver signal after the charging signal satisfies the predetermined threshold for a given period of time.

20. The apparatus of claim 19, wherein the comparator comprises an analog or digital comparator.

21. The apparatus of claim 19, wherein the interval sequencer comprises a signal generator.

22. The apparatus of claim 21, wherein the signal generator produces an interruptible period-pulse-type signal.

23. The apparatus of claim 19, wherein the timer/driver comprises:

a timer module that counts to a pre-selected value in response to the threshold-detection signal; and a driver module for providing the detection-driver signal after the charging signal satisfies the predetermined threshold for a given period of time.

24. The apparatus of claim 19, wherein the given period of time is instantaneous.

25. The apparatus of claim 19, further including a signal inverter for inverting the threshold-detection signal to prevent false detection the at least one condition that indicates that the battery cannot be charged.

26. The apparatus of claim 2, wherein the apparatus is deployed in a battery charging device.

27. The apparatus of claim 2, wherein the apparatus is deployed in a battery testing device.

* * * * *